US011066152B2

(12) United States Patent
Tsai

(10) Patent No.: US 11,066,152 B2
(45) Date of Patent: *Jul. 20, 2021

(54) SLOTTED ENTRY GIMBAL

(71) Applicant: The Boeing Company, Chicago, IL (US)

(72) Inventor: Kevin R. Tsai, Chicago, IL (US)

(73) Assignee: The Boeing Company, Chicago, IL (US)

(*) Notice: Subject to any disclaimer, the term of this patent is extended or adjusted under 35 U.S.C. 154(b) by 572 days.

This patent is subject to a terminal disclaimer.

(21) Appl. No.: 15/989,850

(22) Filed: May 25, 2018

(65) Prior Publication Data

US 2019/0359322 A1    Nov. 28, 2019

(51) Int. Cl.
*B64C 13/28* (2006.01)
*F16H 25/24* (2006.01)
*F16H 25/22* (2006.01)

(52) U.S. Cl.
CPC ............ *B64C 13/28* (2013.01); *F16H 25/24* (2013.01); *F16H 25/2204* (2013.01); *F16H 2025/2481* (2013.01)

(58) Field of Classification Search
CPC ..... B64C 13/28; F16H 25/24; F16H 25/2204; F16H 2025/2481
USPC ...................................................... 244/99.2
See application file for complete search history.

(56) References Cited

U.S. PATENT DOCUMENTS

| 2,698,527 | A | * | 1/1955 | Anderson | ............... | F16D 3/387 |
| | | | | | | 464/130 |
| 3,464,283 | A | * | 9/1969 | Miller | ..................... | F16H 25/24 |
| | | | | | | 74/89.36 |
| 4,480,809 | A | | 11/1984 | Healey | | |
| 5,376,051 | A | * | 12/1994 | Valencic | ................. | F16D 3/387 |
| | | | | | | 464/130 |
| 5,619,195 | A | | 4/1997 | Allen et al. | | |
| 5,769,720 | A | | 6/1998 | Aiken et al. | | |

(Continued)

FOREIGN PATENT DOCUMENTS

| DE | 38 30 526 | 3/1990 |
| DE | 10 2010 041160 | 3/2012 |

(Continued)

OTHER PUBLICATIONS

Extended European Search Report prepared by the European Patent Office in application No. EP 19 17 2848.4, dated Dec. 19, 2019.

*Primary Examiner* — Christopher P Ellis
(74) *Attorney, Agent, or Firm* — McDonnell Boehnen Hulbert & Berghoff LLP

(57) ABSTRACT

The present disclosure provides a slotted entry gimbal including an inner ring with a first side and a second side. The inner ring includes a first pin extending from the first side of the inner ring and a second pin extending from the second side of the inner ring. The slotted entry gimbal also includes an outer ring including a first side and a second side. The outer ring includes a first opening on the first side configured to receive the first pin and a second opening on the second side configured to receive the second pin. The outer ring includes a first slotted entry opening on the first side extending from a first edge of the outer ring to the first opening, and the outer ring includes a second slotted entry opening on the second side extending from a second edge of the outer ring to the second opening.

20 Claims, 8 Drawing Sheets

(56) References Cited

U.S. PATENT DOCUMENTS

| | | | |
|---|---|---|---|
| 6,202,968 B1 | 3/2001 | Lehr | |
| 8,033,500 B1* | 10/2011 | Charafeddine | B64C 13/42 244/75.1 |
| 8,191,824 B2* | 6/2012 | Shaheen | G01L 1/2225 244/76 A |
| 8,291,782 B1* | 10/2012 | Shaheen | B64C 9/02 74/89.26 |
| 9,717,486 B2* | 8/2017 | Cooper | A61B 34/71 |
| 10,040,539 B2* | 8/2018 | Antunes | F16H 25/205 |
| 10,669,013 B2* | 6/2020 | Tsai | B64C 13/30 |
| 2006/0156838 A1* | 7/2006 | Las Navas Garcia | F16H 25/24 74/89.23 |
| 2010/0001125 A1* | 1/2010 | Cavalier | B64C 13/341 244/99.3 |
| 2011/0006154 A1* | 1/2011 | Maresko | F16D 7/007 244/99.2 |
| 2013/0313358 A1* | 11/2013 | Hale | B64C 13/341 244/99.3 |
| 2014/0175217 A1* | 6/2014 | Ishihara | B64C 9/16 244/99.3 |
| 2016/0280356 A1* | 9/2016 | Medina | F16H 25/205 |
| 2017/0158313 A1* | 6/2017 | Tilloy | F16H 25/2015 |
| 2019/0055005 A1* | 2/2019 | Young | B64C 13/28 |
| 2019/0101197 A1* | 4/2019 | Gavriliuc | F16H 25/205 |
| 2019/0248474 A1 | 8/2019 | Tsai et al. | |
| 2019/0271282 A1* | 9/2019 | Hawksworth | F16H 25/2056 |
| 2019/0291851 A1* | 9/2019 | Wagner | B64C 9/20 |
| 2019/0359322 A1* | 11/2019 | Tsai | F16H 25/24 |
| 2020/0039637 A1* | 2/2020 | Polcuch | F16H 25/205 |

FOREIGN PATENT DOCUMENTS

| | | | |
|---|---|---|---|
| EP | 2 436 844 | 4/2012 | |
| FR | 2 220 344 | 10/1974 | |
| GB | 2427455 A * | 12/2006 | F16H 25/2454 |

* cited by examiner

PRIOR ART

PRIOR ART

SLOTTED ENTRY GIMBAL

FIELD

The present disclosure relates generally to gimbaled systems, and more particularly, to two-axis gimbal systems with a slotted entry for assembly of the inner ring with respect to the outer ring of the gimbal.

BACKGROUND

Traditional gimbals are installed onto a ball screw by rotating the inner ring of the gimbal 90 degrees with respect to its final orientation, positioning the outer ring of the gimbal over the screw and inner ring of the gimbal, and then rotating the inner ring of the gimbal back 90 degrees. This installation requires a width clearance that is unproductive in service and is only used for installation and assembly of the gimbal. This additional width causes the mating parts to also be wider than necessary, which adds weight and cost to the airplane. When such ball screws and gimbals are used to power flaps, the gimbal is positioned inside of a fairing. Since the outer ring of the gimbal has additional width that is only necessary for installation, the fairing that wraps around the gimbal is also wider than necessary, possibly inducing high speed drag on the airplane.

Accordingly, there is a need for a gimbal with an alternative installation method of the inner ring with respect to the outer ring that removes the need for additional width of the outer ring of the gimbal, enabling a better load path that may result in smaller and lighter parts.

SUMMARY

In one aspect, a slotted entry gimbal is described. The slotted entry gimbal includes (a) an inner ring including a first side and a second side opposite the first side, wherein the inner ring includes a first pin extending from the first side of the inner ring and a second pin extending from the second side of the inner ring, wherein the first pin and the second pin are diametrically opposed, and (b) an outer ring including a first side and a second side opposite the first side, wherein the outer ring includes a first opening on the first side configured to receive the first pin and a second opening on the second side configured to receive the second pin, wherein the outer ring includes a first slotted entry opening on the first side extending from a first edge of the outer ring to the first opening, and wherein the outer ring includes a second slotted entry opening on the second side extending from a second edge of the outer ring to the second opening.

In another aspect, a method is described. The method includes (a) positioning an inner ring of a slotted gimbal assembly onto a threaded screw, wherein the inner ring includes a first side and a second side opposite the first side, wherein the inner ring includes a first pin extending from the first side of the inner ring and a second pin extending from the second side of the inner ring, wherein the first pin and the second pin are diametrically opposed, (b) positioning the first pin into a first slotted entry opening on a first side of an outer ring, (c) positioning the second pin into a second slotted entry opening on a second side of the outer ring, and (d) moving the outer ring laterally with respect to the inner ring until the first pin is positioned in a first opening on the first side of the outer ring and the second pin is positioned in a second opening on the second side of the outer ring.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying figures.

DETAILED DESCRIPTION

Disclosed embodiments will now be described more fully hereinafter with reference to the accompanying figures, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Figure 8:
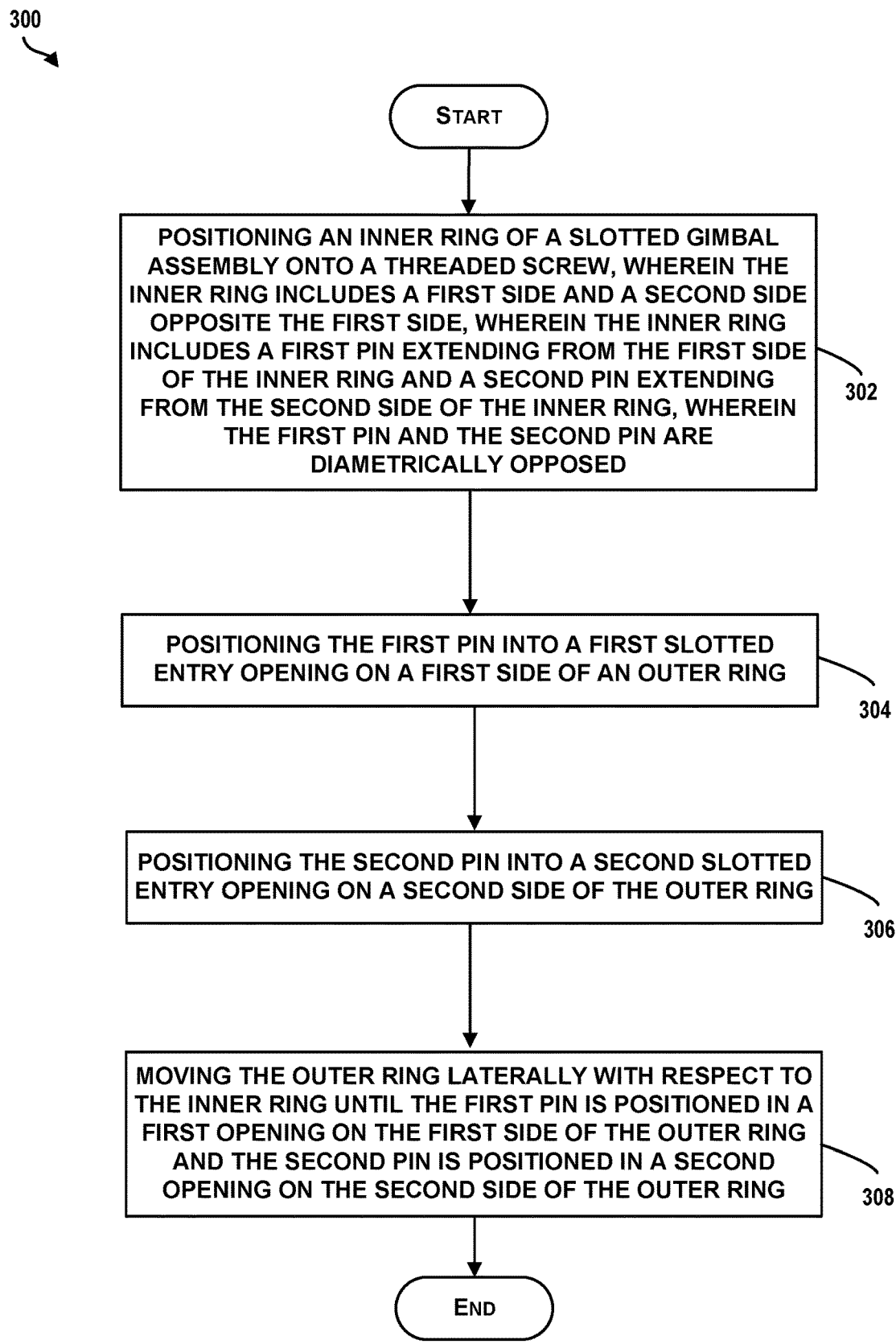
FIG. 8 is a flowchart of an example method, according to an example embodiment.

In FIG. 8, the blocks may represent operations and/or portions thereof and lines connecting the various blocks do not imply any particular order or dependency of the operations or portions thereof. It will be understood that not all dependencies among the various disclosed operations are necessarily represented. FIG. 8 and the accompanying disclosure describing the operations of the method(s) set forth herein should not be interpreted as necessarily determining a sequence in which the operations are to be performed.

Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein, with respect to measurements, "about" and "substantially" each means+/−5%.

Illustrative, non-exhaustive examples, which may or may not be claimed, of the subject matter according the present disclosure are provided below.

Within examples, a slotted entry gimbal is described herein. As discussed above, traditional gimbals may be wider than necessary for some installations. This additional width causes the mating parts to be wide, which can add weight and cost to the airplane. When ball screws and gimbals are used to power flaps on the wings of the aircraft, the gimbal is positioned inside of a fairing. Since the gimbal has additional width that is only required for installation, the fairing that wraps around the gimbal may be required to be built wider than necessary, which would then induce high speed drag on the airplane. Examples described herein allow clearance for the inner ring of the gimbal to be directly inserted into the outer ring of the gimbal via a pair of diametrically opposed openings in the outer ring of the gimbal. This lessens or removes the need for the extra width of a traditional gimbal, enabling a better load path which induces less bending stress on the gimbal, which may result in smaller, lighter parts. These smaller parts allow for smaller fairings, which in turn improves high speed and low speed performance of the aircraft.

Various other features of the example systems discussed above, as well as methods for using these systems, are also described hereinafter with reference to the accompanying figures.

Figure 1:
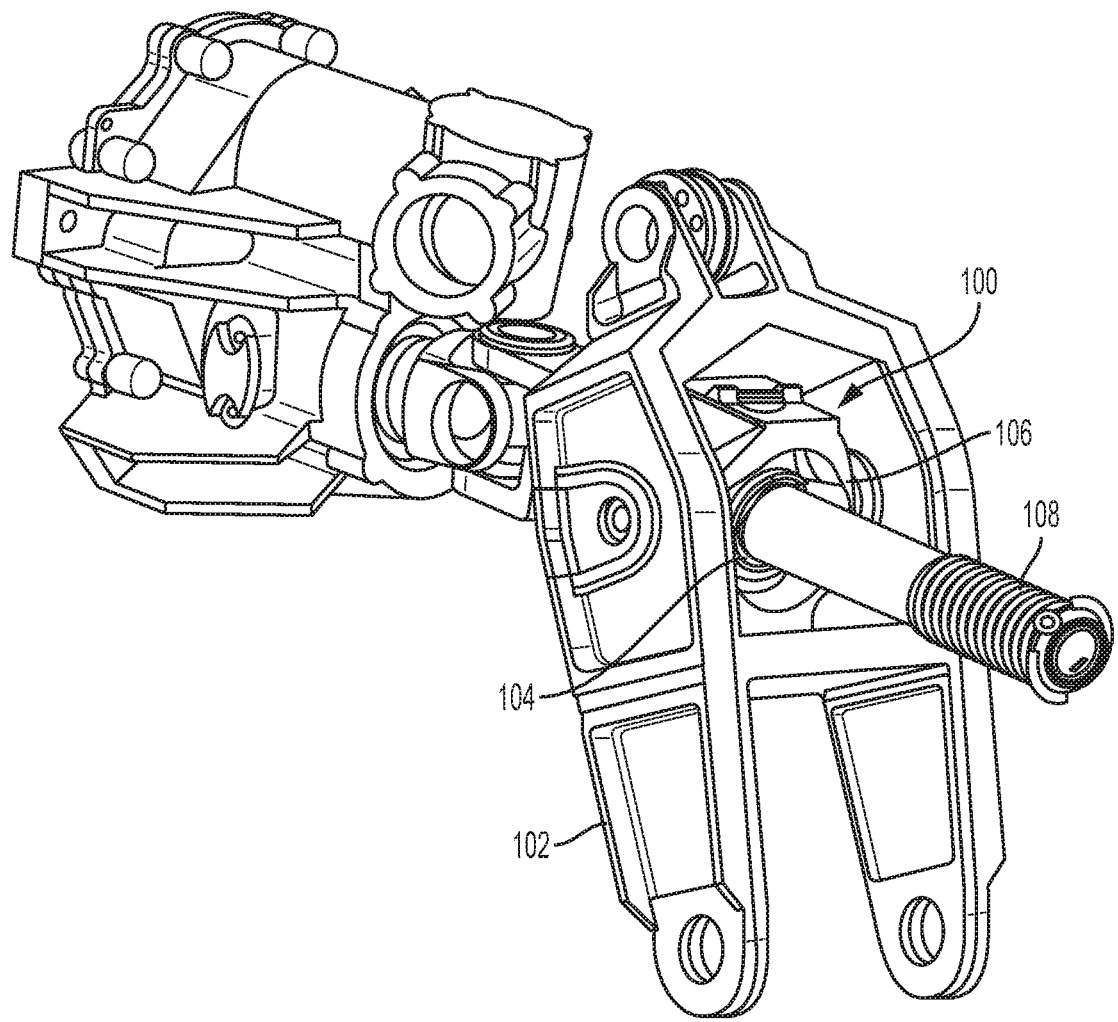
FIG. 1 is a perspective view of a gimbal coupled to a drive arm, according to an example embodiment.

With reference to the Figures, FIG. 1 illustrates a traditional gimbal 100 attached to a drive arm 102 of an aircraft wing flap mechanism. In some examples, the drive arm 102 is connected to the flap of the aircraft wing (not shown), and is used to move the flap of the aircraft wing to alter the aerodynamic properties of the aircraft. The traditional gimbal 100 includes an inner ring 104 coupled to an outer ring 106. The inner ring 104 is positioned on a ball screw 108. As such, the traditional gimbal 100 translates with the inner ring 104 as the ball screw 108 rotates, thereby pushing the flap of the aircraft wing out. The inner ring 104 and the outer ring 106 of the traditional gimbal 100 allow an additional degree of freedom to avoid bending the ball screw 108.

Figure 2B:
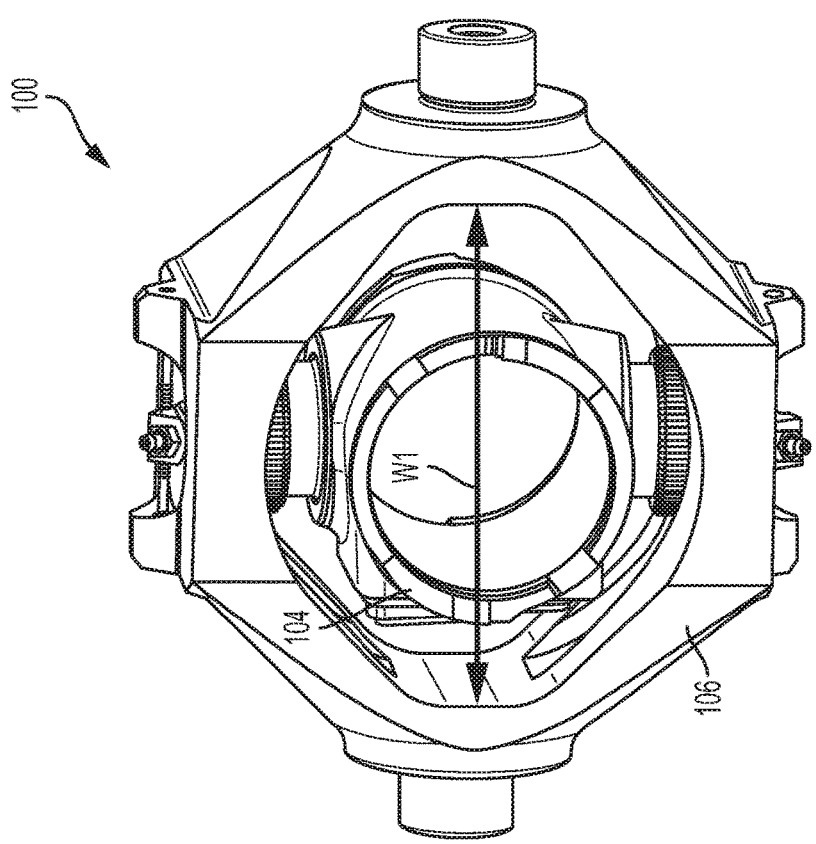
FIG. 2B is a perspective view of the traditional gimbal of FIG. 2A after assembly, according to an example embodiment.
Figure 2A:
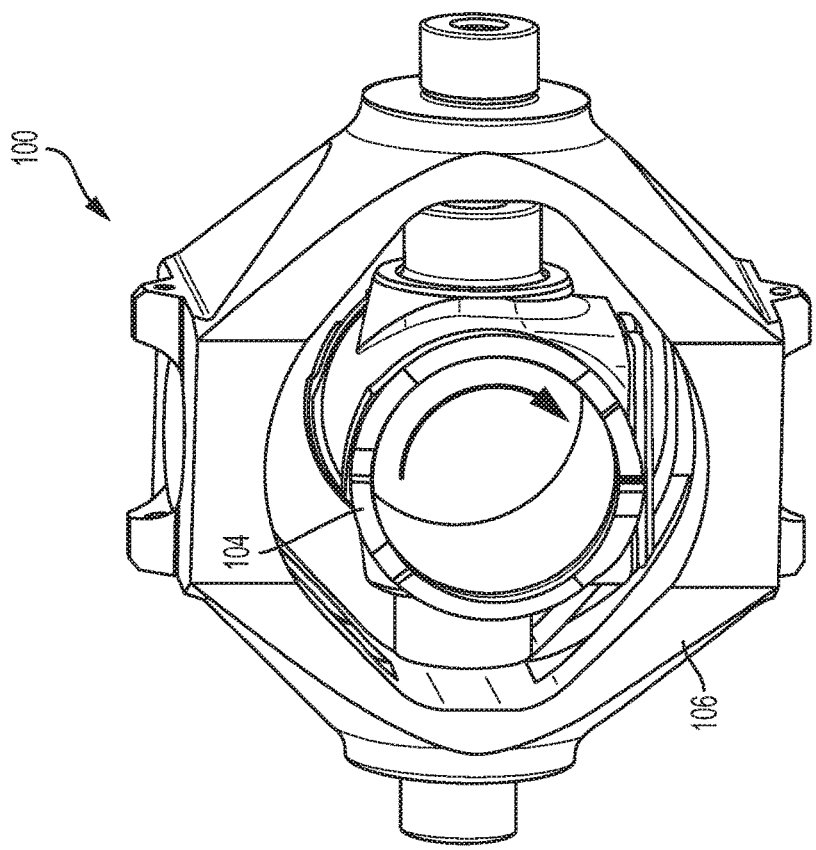
FIG. 2A is a perspective view of a traditional gimbal during assembly, according to an example embodiment.

FIGS. 2A-2B illustrate an example assembly process of the traditional gimbal 100. As shown in FIG. 2A, the outer ring 106 of the traditional gimbal 100 is one piece, and the inner ring 104 is rotated 90 degrees with respect to its final orientation. The outer ring 106 is then positioned over the ball screw 108 and inner ring 104. The inner ring 104 is then rotated 90 degrees with respect to the outer ring 106 to its final installed orientation. This additional rotation step can cause complications on installation. Upon installation the gimbal area is crowded and has poor access to manipulate the inner ring 104. Applying the necessary force to re-align the inner ring 104 with the outer ring 106 can be difficult.

Figure 3:
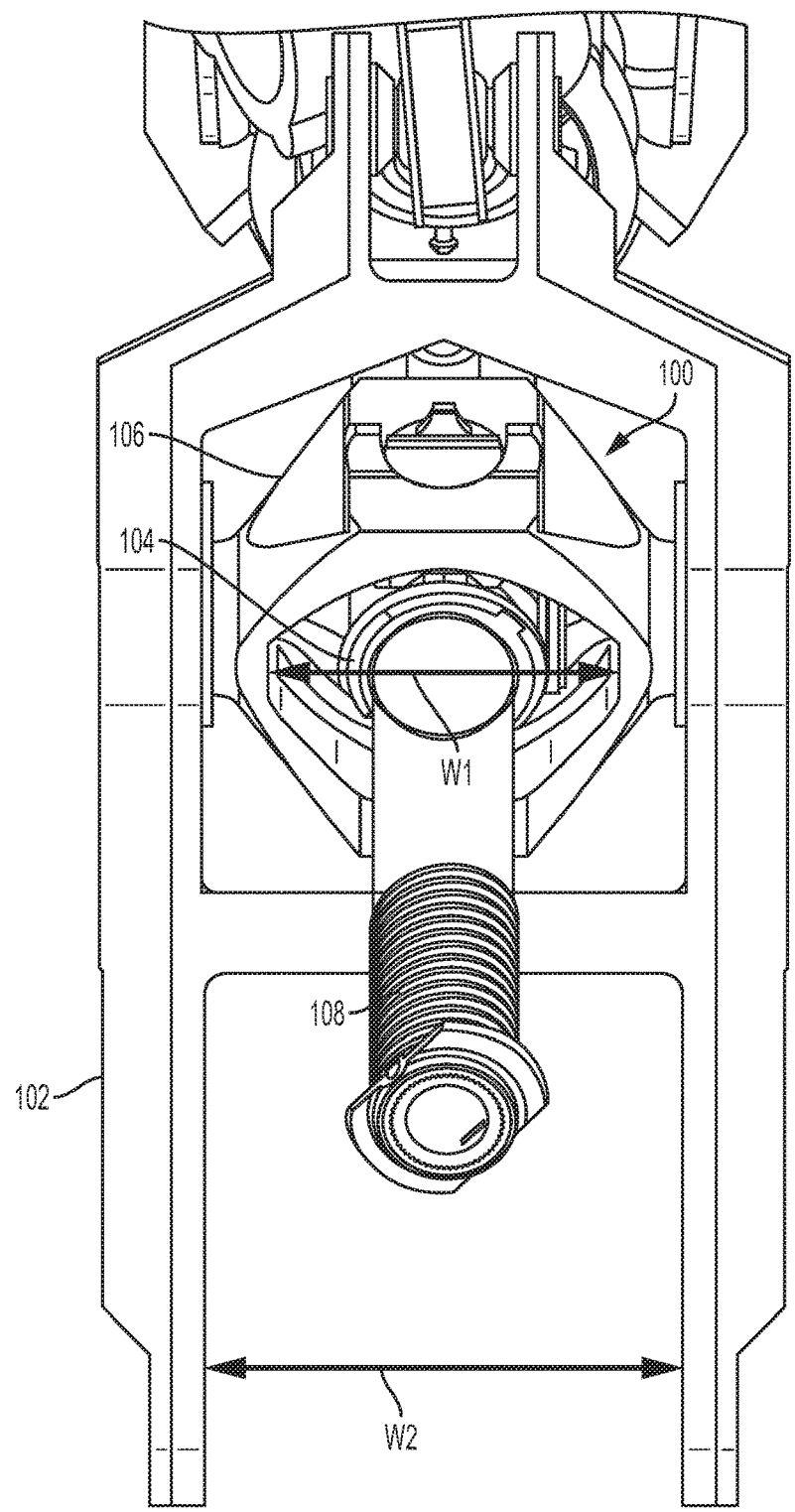
FIG. 3 is front view of the traditional gimbal of FIGS. 2A-2B coupled to a drive arm, according to an example embodiment.

The final assembly is shown in FIG. 2B. As discussed above, such an installation requires a width (W1) clearance that is unproductive in service and is only used for installation and assembly of the traditional gimbal 100. This additional width causes the mating parts to also be wider than necessary, which adds weight and cost to the airplane, as well as reducing high speed performance. Further, as shown in FIG. 3, the additional width (W1) of the outer ring 106 of the traditional gimbal 100 necessitates the width (W2) of the drive arm 102 to increase as well, increasing cost and weight. In addition, the increased width (W2) of the drive arm 102 increases bending stress to the system, which is not desirable.

Figure 4:
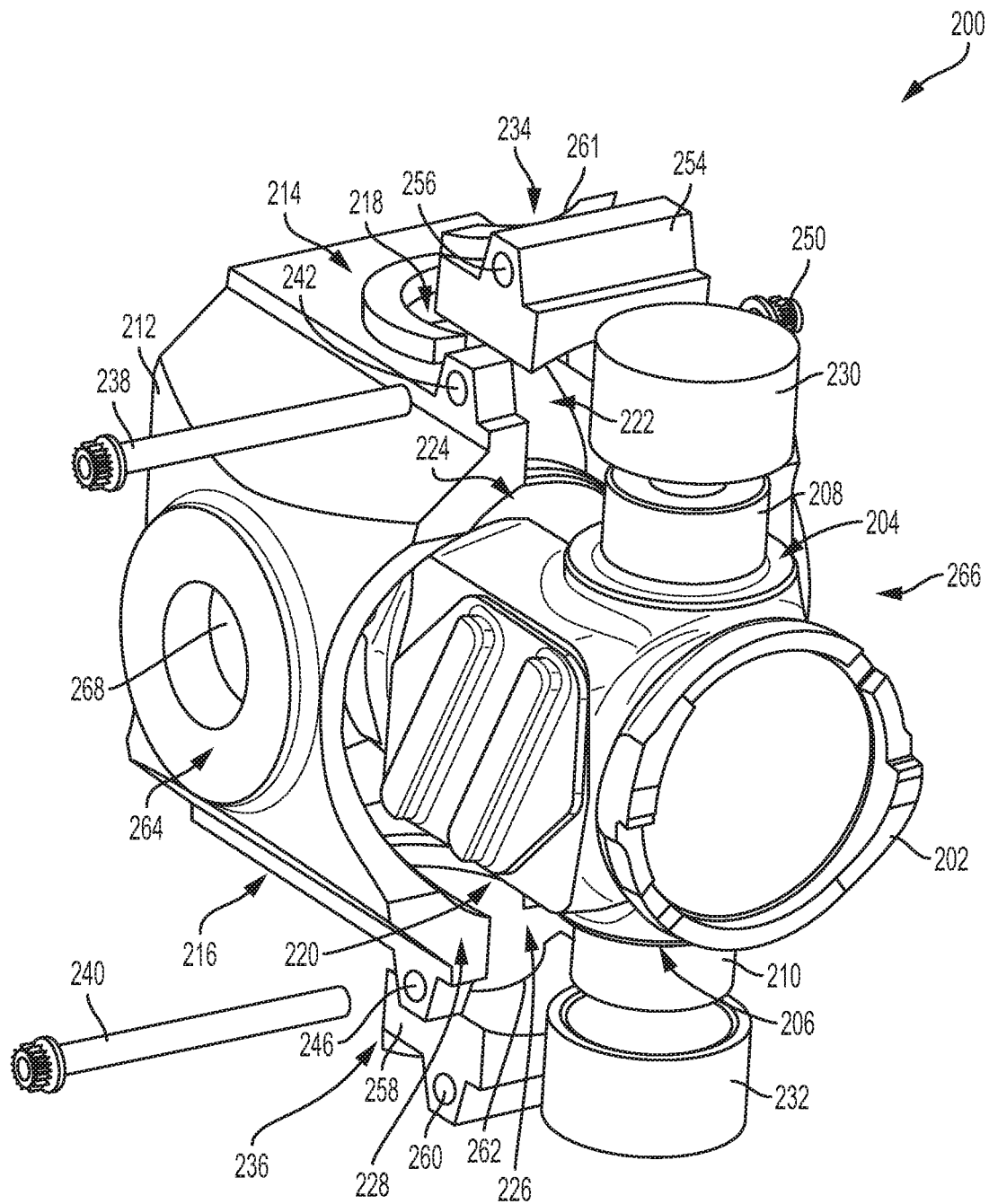
FIG. 4 is a perspective exploded view of an example slotted entry gimbal, according to an example embodiment.

FIG. 4 illustrates a perspective exploded view a slotted entry gimbal 200, according to an example embodiment. As shown in FIG. 4, the slotted entry gimbal 200 includes an inner ring 202 with a first side 204 and a second side 206 opposite the first side 204. The inner ring 202 includes a first pin 208 extending from the first side 204 of the inner ring 202 and a second pin 210 extending from the second side 206 of the inner ring 202. The first pin 208 and the second pin 210 are diametrically opposed. The slotted entry gimbal 200 also includes an outer ring 212 with a first side 214 and a second side 216 opposite the first side 214. The outer ring 212 includes a first opening 218 on the first side 214 configured to receive the first pin 208 and a second opening 220 on the second side 216 configured to receive the second pin 210. The outer ring 212 also includes a first slotted entry opening 222 on the first side 214 extending from a first edge 224 of the outer ring 212 to the first opening 218. The outer ring 212 also includes a second slotted entry opening 226 on the second side 216 extending from a second edge 228 of the outer ring 212 to the second opening 220.

In one example, an inner diameter of the outer ring 212 is less than a distance from the first pin 208 to the second pin 210. Such an arrangement is different than the design of the traditional gimbal 100 described above in FIGS. 1-3. In contrast, in the traditional gimbal 100, the inner diameter of the outer ring 106 is greater than a distance from the first pin of the inner ring 104 to the second pin of the inner ring 104. As such, the width of the outer ring 212 of the gimbal 200 described in FIGS. 4-7 is less than the width of the outer ring 106 of the traditional gimbal 100 described in FIGS. 1-3. As discussed above, the reduction in width reduces material cost, enables better load paths with less bending, and also reduces the size of fairings covering the gimbal, which improves aerodynamic properties. In particular, by having smaller distances between load transfer joints, the bending moment across parts is decreased. This reduces stress in the part and further may enable lighter parts. An inner surface of the inner ring 202 may be threaded to receive a corresponding threaded screw to enable movement of the inner ring 202 with respect to the threaded screw, as discussed above. The threads may include a plurality of ball bearings that run between the threaded screw and the inner ring 202.

As discussed above, in a traditional gimbal 100 the inner ring 104 is rotated 90 degrees with respect to the outer ring 106 to its final installed orientation. This additional rotation step can cause complications on installation. The proposed invention allows the inner ring 202 to be oriented before the outer ring 212 is mated with it, so no further manipulation is required on assembly.

The outer ring 212 may be configured to rotate with respect to the inner ring 202 via the first and second pins 208, 210 inserted into the first and second openings 218, 220. Such an arrangement allows an additional degree of freedom to avoid bending the ball screw on which the inner ring 202 is positioned when in use. In one particular example, the slotted entry gimbal 200 further includes a first bushing 230 positioned on the first pin 208, and a second bushing 232 positioned on the second pin 210. The first bushing 230 and the second bushing 232 provide a lubrication grooves to the posts 208, 210 as well as being a sacrificial rub piece between the inner ring 202 and outer ring 212. In one example, a width of the first slotted entry opening 222 is less than a diameter of the first bushing 230, and a width of the second slotted entry opening 226 is less than a diameter of the second bushing 232. As such, when the first bushing 230 is positioned on the first pin 208, the first pin 208 cannot move out of the first slotted entry opening 222 towards the first edge 224. Similarly, when the second bushing 232 is positioned on the second pin 210, second pin 210 cannot move out of the second slotted entry opening 226 towards the second edge 228.

In another example, a width of the first slotted entry opening 222 is greater than a diameter of the first pin 208, and a width of the second slotted entry opening 226 is greater than a diameter of the second pin 210. In such an example, the first pin 208 may be snap fit into the first slotted entry opening 222, and the second pin 210 may be snap fit into the second slotted entry opening 226. In particular, the first slotted entry opening 222 may open slightly in response to a force pushing the first pin 208 into the first slotted entry opening 222 in a direction away from the first edge 224. Once the first pin 208 enters the first opening 218, the first slotted entry opening 222 may snap shut securing the first pin 208 in the first opening 218. Similarly, the second slotted entry opening 226 may open slightly in response to a force pushing the second pin 210 into the second slotted entry opening 226 in a direction away from the second edge 228. Once the second pin 210 enters the second opening 220, the second slotted entry opening 226 may snap shut securing the second pin 210 in the second opening 220.

In another example, the slotted entry gimbal 200 further includes a first retaining member 234 coupled to the first side 214 of the outer ring 212, and a second retaining member 236 coupled to the second side 216 of the outer ring 212. The first retaining member 234 and the second retaining member 236 are configured to prevent lateral movement of the inner ring 202 with respect to the outer ring 212. The first retaining member 234 and the second retaining member 236 may take a variety of forms, as discussed in additional detail below. The first retaining member 234 and the second retaining member 236 comprise any structure that prevents lateral movement of the inner ring 202 with respect to the outer ring 212. The first retaining member 234 and the second retaining member 236 may be removably coupled to the outer ring 212, such that the inner ring 202 can be installed and un-installed.

In one particular example, the first retaining member 234 comprises a first retaining pin 238 and the second retaining member 236 comprises a second retaining pin 240. In such an example, the slotted entry gimbal 200 further includes a first through-hole 242 at a first side of the first slotted entry opening 222, and a second through-hole 244 at a second side of the first slotted entry opening 222. A longitudinal axis of the first through-hole 242 and the second through-hole 244 are perpendicular to a longitudinal axis of the first opening 218 and the second opening 220, and the first retaining pin 238 is positioned through the first through-hole 242 and the second through-hole 244. The slotted entry gimbal 200 may further include a third through-hole 246 at a first side of the second slotted entry opening 226, and a fourth through-hole 248 at a second side of the second slotted entry opening 226. A longitudinal axis of the third through-hole 246 and the fourth through-hole 248 are perpendicular to the longitudinal axis of the first opening 218 and the second opening 220, and the second retaining pin 240 is positioned through the third through-hole 246 and the fourth through-hole 248.

The first retaining pin 238 may comprise a threaded bolt, and the slotted entry gimbal 200 may further include a complementary nut 250 to secure the first retaining pin 238 in the first through-hole 242 and the second through-hole 244. Similarly, the second retaining pin 240 may comprise a threaded bolt, and the slotted entry gimbal 200 may further include a complementary nut 252 to secure the second retaining pin 240 in the third through-hole 246 and the fourth through-hole 248. When the retaining pins 238, 240 are positioned in their respective through-holes, the inner ring 202 cannot move laterally out of the first and second slotted entry openings 222, 226.

In one example, the first retaining member 234 further comprises a first insert 254 positioned between the first through-hole 242 and the second through-hole 244. The first insert 254 includes a through-hole 256 aligned with the first through-hole 242 and the second through-hole 244 to receive the first retaining pin 238. In such an example, the second retaining member further includes a second insert 258 positioned between the third through-hole 246 and the fourth through-hole 248. The second insert 258 includes a through-hole 260 aligned with the third through-hole 246 and the fourth through-hole 248 to receive the second retaining pin 240. In the example including the first and second bushings 230, 232, the inserts 254, 258 and retaining pins 238, 240 prevent the bushings 230, 232 from moving parallel to the longitudinal axis of the inner ring 202.

Figure 5:
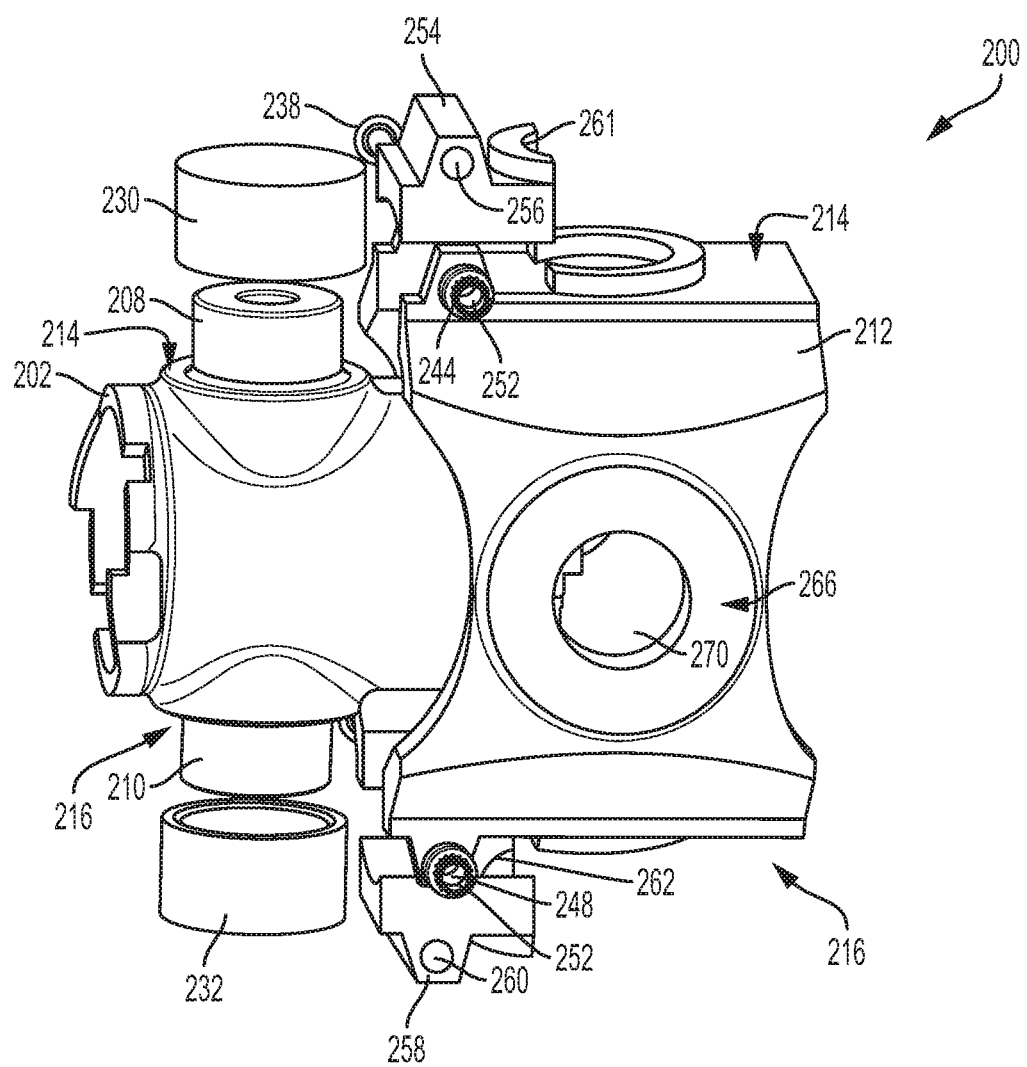
FIG. 5 is a side exploded view of the example slotted entry gimbal of FIG. 4, according to an example embodiment.
Figure 6:
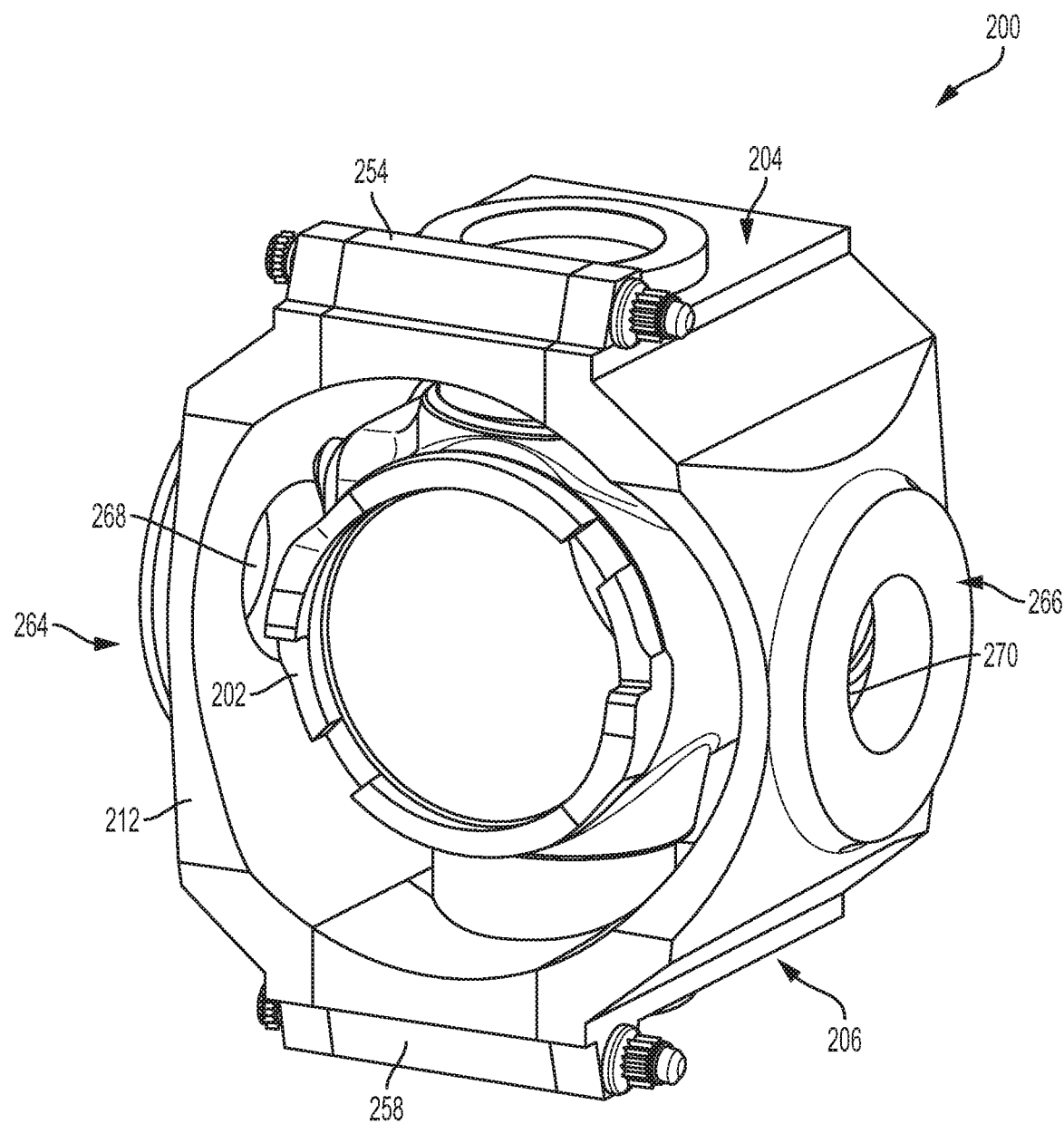
FIG. 6 is a perspective view of the example slotted entry gimbal of FIG. 4 fully assembled, according to an example embodiment.
Figure 7:
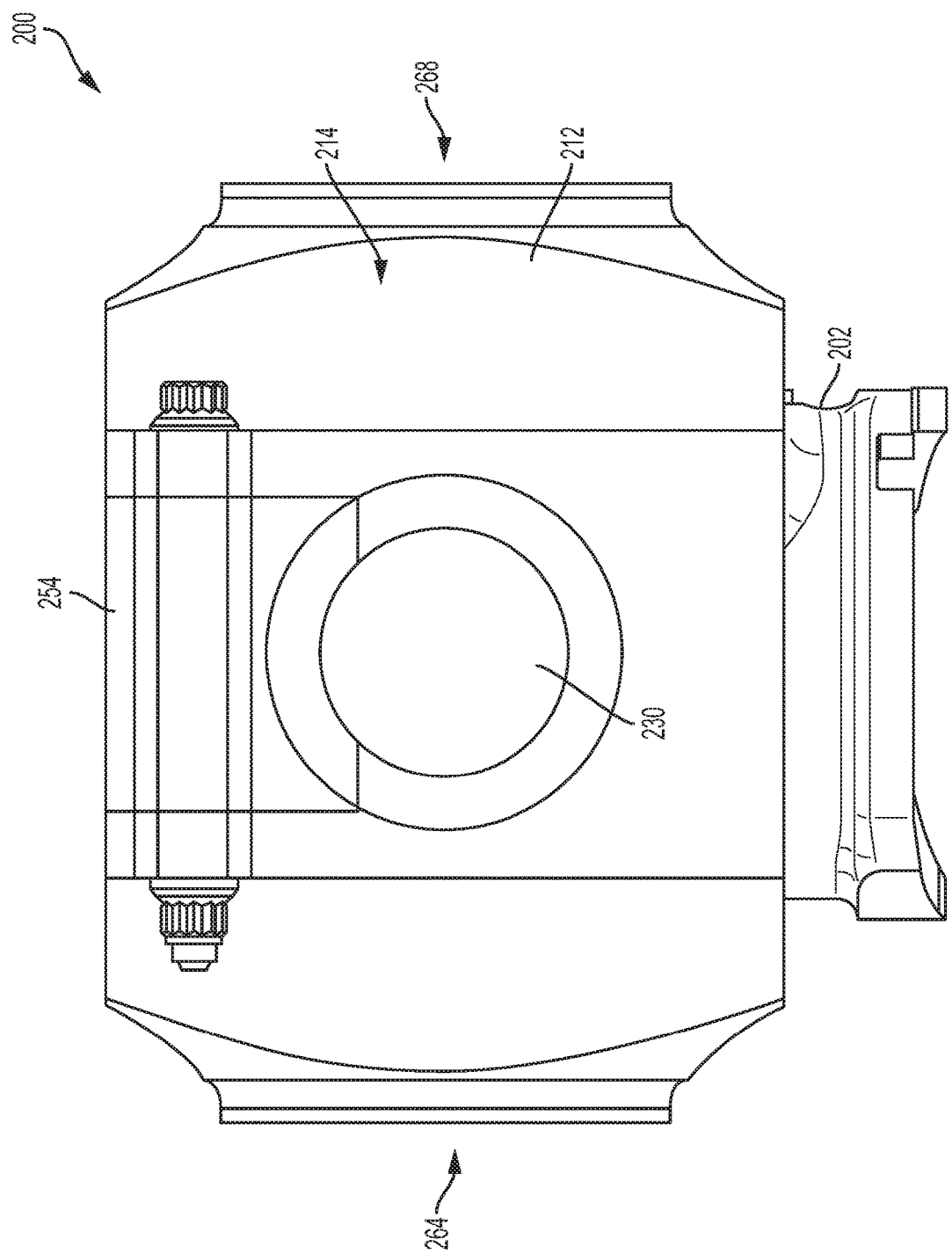
FIG. 7 is a top view of the example slotted entry gimbal of FIG. 4 fully assembled, according to an example embodiment.

In one example, as shown in the side exploded view of FIG. 5, the first insert 254 includes a first curved portion 261 configured to contact an outer surface of the first pin 208 or an outer surface of the first bushing 230, and the second insert 258 includes a second curved portion 262 configured to contact an outer surface of the second pin 210 or an outer surface of the second bushing 232. The first curved portion 261 may have the same radius or curvature as the first opening 218, and the second curved portion 262 may have the same radius of curvature as the second opening 220. The first opening 218 and first curved portion 261 may include a first inner lip, and the second opening 220 and second curved portion 262 may include a second inner lip. The first inner lip may have a smaller inner diameter than the diameter of the first opening 218, and similarly the second inner lip may have a smaller diameter than the diameter of the second opening 220. Further, the diameter of the first inner lip may be smaller than the diameter of the first bushing 230, and the diameter of the second inner lip may be smaller than the diameter of the second bushing 232, such that the bushings 230, 232 are captured along their own axis.

In one example, the inner ring 202 and the outer ring 212 comprise a first material, and the first insert 254 and the second insert 258 comprise a second material that is different than the first material. In use, the first insert 254 and the second insert 258 experience significantly less load than the inner ring 202 and the outer ring. As such, the first insert 254 and the second insert 258 can be made from a lighter or less expensive material. In one such example, the first material may comprise steel or aluminum, while the second material comprises plastic or other lightweight material. The first and second inserts 254, 258 may experience only minor forces, so the second material does not need the same strength properties that are required for the inner ring 202 and outer ring 212.

The outer ring may also include a third side 264 and a fourth side 266 opposite the third side 264, and the outer ring 212 may include a third opening 268 on the third side 264 and a fourth opening 270 on the fourth side 266 (e.g., female components). The third opening 268 and the fourth opening 270 are configured to receive corresponding male components of a structure to thereby couple the slotted entry gimbal 200 to the structure. For example, the third opening 268 and the fourth opening 270 are configured to receive corresponding male components of the drive arm 102 illustrated in FIGS. 1 and 3. In another example, the outer ring 212 includes a third pin extending from the third side 264 and a fourth pin extending from the fourth side 266 (e.g., male components). Such an arrangement is shown in FIGS. 2A-2B. The third pin and the fourth pin are configured to fit within corresponding female components of a structure to thereby couple the slotted entry gimbal 200 to the structure. Any combination of male and female components are possible for the third side 264 and fourth side 266 of the outer ring 212.

The slotted entry gimbal 200 described above in relation to FIGS. 4-7 enable assembly without the requirement of rotating the outer ring 212 with respect to the inner ring 202. As such, the width of the outer ring 212 can be reduced when compared with an outer ring 106 of a gimbal 100, for a similarly sized inner ring 104, 202. As discussed above, the reduction in width reduces material cost, enables better load paths with less bending, and also reduces the size of fairings covering the gimbal, which improves aerodynamic properties.

FIG. 8 is a block diagram of an example method. Method 300 shown in FIG. 8 presents an embodiment of a method that could be used to assemble the slotted entry gimbal 200 discussed above in relation to FIGS. 4-7, as an example. Method 300 includes one or more operations, functions, or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 302, the method 300 includes positioning an inner ring 202 of a slotted entry gimbal 200 onto the ball screw 108. The inner ring 202 includes a first side 204 and a second side 206 opposite the first side 204, the inner ring includes a first pin 208 extending from the first side 204 of the inner ring 202 and a second pin 210 extending from the second side 206 of the inner ring 202, and the first pin 208 and the second pin 210 are diametrically opposed.

At block 304, the method 300 includes positioning the first pin 208 into a first slotted entry opening 222 on a first side 214 of an outer ring 212. At block 306, the method 300 includes positioning the second pin 210 into a second slotted entry opening 226 on a second side 216 of the outer ring 212. At block 308, the method 300 includes moving the outer ring 212 laterally with respect to the inner ring 202 until the first pin 208 is positioned in a first opening 218 on the first side 214 of the outer ring 212 and the second pin 210 is positioned in a second opening 220 on the second side 216 of the outer ring 212.

In one example, the method 300 further includes coupling the outer ring 212 to a drive arm of an aircraft wing flap mechanism. In another example, the method 300 further includes positioning a first bushing 230 on the first pin 208, and positioning a second bushing 232 on the second pin 210 to enable the outer ring 212 to rotate with respect to the inner ring 202.

In another example, the method 300 further includes coupling a first retaining member 234 to the first side 214 of the outer ring 212, and coupling a second retaining member 236 to the second side 216 of the outer ring 212. As discussed above, the first retaining member 234 and the second retaining member 236 comprise any structure that prevents lateral movement of the inner ring 202 with respect to the outer ring 212.

In one particular example, the first retaining member 234 comprises a first insert 254 and a first retaining pin 238, and the second retaining member 236 comprises a second insert 258 and a second retaining pin 240. In such an example, the method 300 may further include (i) positioning the first insert 254 into the first slotted entry opening 222 until the first insert 254 contacts the first pin 208, (ii) positioning the first retaining pin 238 through a first through-hole 242 at a first side of the first slotted entry opening 222, through a through-hole 256 of the first insert 254, and further though a second through-hole 244 at a second side of the first slotted entry opening 222, (iii) positioning the second insert 258 into the second slotted entry opening 226 until the second insert 258 contacts the second pin 210, and (iv) positioning the second retaining pin 240 through a third through-hole 246 at a first side of the second slotted entry opening 226, through a through-hole 260 of the second insert 258, and further through a fourth through-hole 248 at a second side of the second slotted entry opening 226.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A slotted entry gimbal comprising:
an inner ring including a first side and a second side opposite the first side, wherein the inner ring includes a first pin extending from the first side of the inner ring and a second pin extending from the second side of the inner ring, wherein the first pin and the second pin are diametrically opposed; and
an outer ring including a first side and a second side opposite the first side, wherein the outer ring includes a first opening on the first side configured to receive the first pin and a second opening on the second side configured to receive the second pin, wherein the outer ring includes a first slotted entry opening on the first side extending from a first edge of the outer ring to the first opening, and wherein the outer ring includes a second slotted entry opening on the second side extending from a second edge of the outer ring to the second opening.

2. The slotted entry gimbal of claim 1, further comprising:
a first bushing positioned on the first pin; and
a second bushing positioned on the second pin, wherein the first bushing and the second bushing enable the outer ring to rotate with respect to the inner ring.

3. The slotted entry gimbal of claim 2, wherein a width of the first slotted entry opening is less than a diameter of the first bushing, and wherein a width of the second slotted entry opening is less than a diameter of the second bushing.

4. The slotted entry gimbal of claim 1, further comprising:
a first retaining member coupled to the first side of the outer ring; and
a second retaining member coupled to the second side of the outer ring, wherein the first retaining member and the second retaining member are configured to prevent lateral movement of the inner ring with respect to the outer ring.

5. The slotted entry gimbal of claim 4, wherein the first retaining member comprises a first retaining pin and the second retaining member comprises a second retaining pin.

6. The slotted entry gimbal of claim 5, further comprising:
a first through-hole at a first side of the first slotted entry opening;
a second through-hole at a second side of the first slotted entry opening, wherein a longitudinal axis of the first through-hole and the second through-hole are perpendicular to a longitudinal axis of the first opening and the second opening, and wherein the first retaining pin is positioned through the first through-hole and the second through-hole;
a third through-hole at a first side of the second slotted entry opening; and
a fourth through-hole at a second side of the second slotted entry opening, wherein a longitudinal axis of the third through-hole and the fourth through-hole are perpendicular to the longitudinal axis of the first opening and the second opening, and wherein the second retaining pin is positioned through the third through-hole and the fourth through-hole.

7. The slotted entry gimbal of claim 6, wherein the first retaining member further comprises a first insert positioned between the first through-hole and the second through-hole, wherein the first insert includes a through-hole aligned with the first through-hole and the second through-hole to receive the first retaining pin, wherein the second retaining member further comprises a second insert positioned between the third through-hole and the fourth through-hole, wherein the second insert includes a through-hole aligned with the third through-hole and the fourth through-hole to receive the second retaining pin.

8. The slotted entry gimbal of claim 7, wherein the first insert includes a first curved portion configured to contact an outer surface of the first pin, and wherein the second insert includes a second curved portion configured to contact an outer surface of the second pin.

9. The slotted entry gimbal of claim 7, wherein the inner ring and the outer ring comprise a first material, and wherein the first insert and the second insert comprise a second material that is different than the first material.

10. The slotted entry gimbal of claim 4, wherein the first retaining member and the second retaining member are removably coupled to the outer ring.

11. The slotted entry gimbal of claim 1, wherein the outer ring includes a third side and a fourth side opposite the third side, wherein the outer ring includes a third opening on the third side and a fourth opening on the fourth side, and wherein the third opening and the fourth opening are configured to receive corresponding male components of a structure to thereby couple the slotted entry gimbal to the structure.

12. The slotted entry gimbal of claim 1, wherein the outer ring includes a third side and a fourth side opposite the third side, wherein the outer ring includes a third pin extending from the third side and a fourth pin extending from the fourth side, and wherein the third pin and the fourth pin are configured to fit within corresponding female components of a structure to thereby couple the slotted entry gimbal to the structure.

13. The slotted entry gimbal of claim 1, wherein a width of the first slotted entry opening is greater than a diameter of the first pin, and wherein a width of the second slotted entry opening is greater than a diameter of the second pin.

14. The slotted entry gimbal of claim 1, wherein an inner surface of the inner ring is threaded to receive a corresponding threaded screw to enable movement of the inner ring with respect to the threaded screw.

15. The slotted entry gimbal of claim 1, wherein an inner diameter of the outer ring is less than a distance from the first pin to the second pin.

16. A method comprising:
positioning an inner ring of a slotted gimbal assembly onto a threaded screw, wherein the inner ring includes a first side and a second side opposite the first side, wherein the inner ring includes a first pin extending from the first side of the inner ring and a second pin extending from the second side of the inner ring, wherein the first pin and the second pin are diametrically opposed;
positioning the first pin into a first slotted entry opening on a first side of an outer ring;
positioning the second pin into a second slotted entry opening on a second side of the outer ring; and
moving the outer ring laterally with respect to the inner ring until the first pin is positioned in a first opening on the first side of the outer ring and the second pin is positioned in a second opening on the second side of the outer ring.

17. The method of claim 16, further comprising:
positioning a first bushing on the first pin; and
positioning a second bushing on the second pin, wherein the first bushing and the second bushing enable the outer ring to rotate with respect to the inner ring.

18. The method of claim 16, further comprising:
coupling a first retaining member to the first side of the outer ring; and
coupling a second retaining member to the second side of the outer ring.

19. The method of claim 18, wherein the first retaining member comprises a first insert and a first retaining pin, and wherein the second retaining member comprises a second insert and a second retaining pin, the method further comprising:
positioning the first insert into the first slotted entry opening until the first insert contacts the first pin;
positioning the first retaining pin through a first through-hole at a first side of the first slotted entry opening, through a through-hole of the first insert, and further though a second through-hole at a second side of the first slotted entry opening;
positioning the second insert into the second slotted entry opening until the second insert contacts the second pin; and
positioning the second retaining pin through a third through-hole at a first side of the second slotted entry opening, through a through-hole of the second insert, and further through a fourth through-hole at a second side of the second slotted entry opening.

20. The method of claim 16, further comprising coupling the outer ring to a drive arm of an aircraft wing flap mechanism.

\* \* \* \* \*